United States Patent
Yan et al.

(10) Patent No.: US 10,007,495 B2
(45) Date of Patent: Jun. 26, 2018

(54) CODE GENERATION METHOD FOR SCHEDULING PROCESSORS USING HOOK FUNCTION AND EXCEPTION HANDLING FUNCTION

(71) Applicant: Huawei Technologies Co., Ltd., Shenzhen (CN)

(72) Inventors: Youliang Yan, Shenzhen (CN); Rongfu Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 76 days.

(21) Appl. No.: 15/058,610

(22) Filed: Mar. 2, 2016

(65) Prior Publication Data

US 2016/0179484 A1 Jun. 23, 2016

Related U.S. Application Data

(63) Continuation of application No. PCT/CN2014/085792, filed on Sep. 3, 2014.

(30) Foreign Application Priority Data

Sep. 3, 2013 (CN) .......................... 2013 1 0395216

(51) Int. Cl.
*G06F 9/45* (2006.01)
*G06F 9/50* (2006.01)
(Continued)

(52) U.S. Cl.
CPC ................ *G06F 8/40* (2013.01); *G06F 9/445* (2013.01); *G06F 9/5027* (2013.01); *G06F 9/5044* (2013.01); *G06F 11/3604* (2013.01)

(58) Field of Classification Search
CPC ........ G06F 8/40; G06F 9/5044; G06F 9/5027; G06F 9/445; G06F 9/3885; G06F 9/3836; G06F 9/4881; G06F 9/3842; G06F 9/3851
See application file for complete search history.

(56) References Cited

U.S. PATENT DOCUMENTS 6,662,359 B1 * 12/2003 Berry .................. G06F 11/3612
714/E11.211
7,039,739 B2 * 5/2006 Bonola .................... G06F 13/24
710/16
(Continued)

FOREIGN PATENT DOCUMENTS

CN 1499363 A 5/2004
CN 1499369 A 5/2004
(Continued)

OTHER PUBLICATIONS

Foreign Communication From A Counterpart Application, PCT Application No. PCT/CN2014/085792, English Translation of International Search Report dated Nov. 28, 2014, 3 pages.
(Continued)

Primary Examiner — Abu Zar Ghaffari
(74) Attorney, Agent, or Firm — Conley Rose, P.C.

(57) ABSTRACT

A code generating method, a compiler, a scheduling method, an apparatus and a scheduling system where the generated code is an executable code and applied to a heterogeneous system, and the heterogeneous system includes an accelerated processor and a central processing unit (CPU) and the code generating method includes acquiring, by a compiler, resource information of the accelerated processor and resource information of the CPU in order to generate an operable platform list, identifying, by the compiler, accelerable code from first user code, embedding, by the compiler, a hook function and an exception handling function
(Continued)

before the accelerable code to form second user code, and compiling, by the compiler, the second user code to obtain the executable code and the executable code generated may automatically implement proper scheduling of processors during execution.

12 Claims, 5 Drawing Sheets

(51) Int. Cl.
  *G06F 9/445* (2018.01)
  *G06F 8/40* (2018.01)
  *G06F 11/36* (2006.01)

(56) References Cited

U.S. PATENT DOCUMENTS

| | | | |
|---|---|---|---|
| 7,496,903 B2* | 2/2009 | Rees | G06F 11/3612 717/124 |
| 8,719,415 B1* | 5/2014 | Sirota | G06F 9/5061 709/221 |
| 2004/0083458 A1 | 4/2004 | Gschwind et al. | |
| 2004/0083462 A1 | 4/2004 | Gschwind et al. | |
| 2004/0088690 A1* | 5/2004 | Shaul | G06F 9/45516 717/154 |
| 2004/0111715 A1 | 6/2004 | Stone | |
| 2005/0081191 A1* | 4/2005 | Pomaranski | G06F 11/2242 717/124 |
| 2007/0283337 A1* | 12/2007 | Kasahara | G06F 8/456 717/149 |
| 2010/0153956 A1 | 6/2010 | Capps et al. | |
| 2010/0251265 A1 | 9/2010 | Hodson et al. | |
| 2010/0299540 A1* | 11/2010 | Brenneman | G06F 1/3225 713/300 |
| 2011/0238957 A1* | 9/2011 | Shirota | G06F 11/3612 712/221 |
| 2012/0075316 A1* | 3/2012 | Kim | G06T 1/20 345/522 |
| 2012/0089859 A1* | 4/2012 | Wang | G06F 9/4812 714/1 |
| 2012/0304160 A1* | 11/2012 | Soeder | G06F 8/41 717/148 |
| 2012/0320071 A1* | 12/2012 | Munshi | G06F 9/4843 345/522 |
| 2014/0136858 A1* | 5/2014 | Jacobson | G06F 9/46 713/300 |
| 2014/0333638 A1* | 11/2014 | Kaminski | G06F 15/17 345/522 |
| 2015/0026697 A1* | 1/2015 | Adams | G06F 9/5077 718/105 |

FOREIGN PATENT DOCUMENTS

| | | |
|---|---|---|
| CN | 1506816 A | 6/2004 |
| CN | 103116513 A | 5/2013 |
| CN | 103124956 A | 5/2013 |
| WO | 2012142069 A2 | 10/2012 |

OTHER PUBLICATIONS

Foreign Communication From A Counterpart Application, PCT Application No. PCT/CN2014/085792, English Translation of Written Opinion dated Nov. 28, 2014, 6 pages.

Foreign Communication From A Counterpart Application, European Application No. 14841750.4, Extended European Search Report dated Jul. 5, 2016, 8 pages.

* cited by examiner

CODE GENERATION METHOD FOR SCHEDULING PROCESSORS USING HOOK FUNCTION AND EXCEPTION HANDLING FUNCTION

CROSS-REFERENCE TO RELATED APPLICATIONS

This application is a continuation of International Application No. PCT/CN2014/085792, filed on Sep. 3, 2014, which claims priority to Chinese Patent Application No. 201310395216.8, filed on Sep. 3, 2013, both of which are hereby incorporated by reference in their entireties.

TECHNICAL FIELD

Embodiments of the present disclosure relate to the field of computer technologies, and in particular, to a code generating method, a compiler, a scheduling method, an apparatus, and a scheduling system.

BACKGROUND

At present, a mainstream method for improving a system computing capability is using a multi-core system. A multi-core system including different types of processors is called as a heterogeneous system, which generally includes a general purpose processor and a special purpose accelerated processing unit. The heterogeneous system has the following advantages. On one hand, the general purpose processor processes scalar computation, and provides a general computing capability such that the heterogeneous system can adapt to applications of various aspects, on the other hand, the special purpose accelerated processing unit may provide powerful computing performance in some specific fields with high energy efficiency such that the heterogeneous system has higher performance and better effectiveness than a homogeneous system.

For the heterogeneous system, the most important problems occur in two aspects. The first is how to use the special purpose accelerated processing unit, and the second is how to achieve the highest overall computing performance of the system. The special purpose accelerated processing unit has a system architecture that is different from that of the general purpose processor, such as a traditional central processing unit (CPU). Therefore, an instruction set of the special purpose accelerated processing unit is incompatible with an instruction set of the traditional CPU. That is, code that runs on the CPU cannot directly run on the special purpose accelerated processing unit. Therefore, a CPU-specific development tool cannot be used to develop a special purpose accelerated processing unit. Nevertheless, to achieve the highest computing performance of the heterogeneous system, computing capabilities of all processors must be made the most of. Because of the great difference on functions and performance between processors, to make the most of computing capabilities of all processors, characteristics of all types of processors must be known in order to properly allocate tasks to the processors.

In a programming manner applied to the heterogeneous system and provided in the prior art, a developer needs to explicitly specify, in a program, on which type of processor a program fragment runs, that is, task allocation is completed by the developer. Open computing language (OpenCL) is a typical implementation of the solution, and provides an open framework standard for heterogeneous system programming. A developer may use a language provided by OpenCL to compile programs that run on processors. Then call an application programming interface (API) that is provided by OpenCL and used in a control system in order to specify which programs run on which types of processors, convert, by means of two-phase compilation, the programs into code that is executable on corresponding processors, and use the API of the control system to call the executable code to run on the corresponding processors.

It can be learned from the foregoing description that, using the programming manner applied to the heterogeneous system and provided in the prior art, a developer needs to solve the problem of system resource scheduling by himself/herself, which requires the developer to be familiar with hardware. In addition, because a scheduling solution is specified in advance and a device on which a program runs has already been specified, the system cannot perform proper scheduling according to a current state. Therefore, when a specified device is in a busy state, the program cannot run on other devices that are idle, which causes a waste of system resources.

SUMMARY

Embodiments of the present disclosure provide a code generating method, a compiler, a scheduling method, an apparatus and a scheduling system such that generated executable code can automatically implement proper scheduling of processors during execution.

According to a first aspect of the embodiments of the present disclosure, a code generating method is provided and is applied to a scheduling system, where the scheduling system includes a heterogeneous system and a compiler, the code is executable code, the executable code is applied to the heterogeneous system, and the heterogeneous system includes an accelerated processing unit and a CPU, and the method includes acquiring, by the compiler, resource information of the accelerated processing unit and resource information of the CPU in order to generate an operable platform list, and identifying accelerable code from first user code according to the resource information of the accelerated processing unit, where the operable platform list includes all accelerated processing units and CPUs, embedding, by the compiler a hook function and an exception handling function before the accelerable code to form second user code, and compiling, by the compiler, the second user code to obtain the executable code, where the executable code includes executable user code obtained by compiling the hook function and the exception handling function, and first accelerable branch code and second accelerable branch code that are obtained by compiling the accelerable code, where the first accelerable branch code is executed by an accelerated processing unit in the operable platform list, the second accelerable branch code is executed by a CPU in the operable platform list, and a purpose of embedding the hook function and the exception handling function is to, when the hook function is being executed in a process of executing the executable code, use condition control code in the exception handling function to select target processing units for the first accelerable branch code and the second accelerable branch code.

With reference to the first aspect of the embodiments of the present disclosure, in a first implementation manner of the first aspect of the embodiments of the present disclosure, before the compiler generates the operable platform list, the method further includes calling a running cost evaluation function to perform running cost evaluation for the accelerated processing units and the CPUs.

With reference to the first implementation manner of the first aspect of the embodiments of the present disclosure, in a second implementation manner of the first aspect of the embodiments of the present disclosure, before the compiling, by the compiler, the second user code to obtain the executable code, the method further includes selecting, by the compiler from the accelerated processing units, a preset quantity of accelerated processing units whose running cost is less than a preset value in order to generate a preferential processor list, where the preferential processor list includes the preset quantity of accelerated processing units that are in the operable platform list and whose running cost is less than the preset value, where the first accelerable branch code is executed by an accelerated processing unit in the preferential processor list.

According to a second aspect of the embodiments of the present disclosure, a scheduling method is provided and is applied to a scheduling system, where the scheduling system includes a scheduling apparatus and a heterogeneous system, where the heterogeneous system includes an accelerated processing unit and a CPU, and the method includes loading and executing, by the scheduling apparatus, executable code generated by a compiler, where the executable code includes executable user code obtained by the compiler by compiling a hook function and an exception handling function, and first accelerable branch code and second accelerable branch code that are obtained by the compiler by compiling accelerable code, where the first accelerable branch code is executed by the accelerated processing unit, and the second accelerable branch code is executed by the CPU, generating, by the scheduling apparatus, an exception when the hook function is being executed, calling, by the scheduling apparatus, the exception handling function, calling a process scheduling interface according to condition control code in the exception handling function, and obtaining, using an operable platform list of the process scheduling interface, target processing units respectively used for executing the first accelerable branch code and the second accelerable branch code, where the operable platform list includes all accelerated processing units and CPUs, and calling, by the scheduling apparatus, the target processing units in order to use the target processing units to execute the first accelerable branch code and the second accelerable branch code.

With reference to the second aspect of the embodiments of the present disclosure, in a first implementation manner of the second aspect of the embodiments of the present disclosure, a method for the obtaining, by the scheduling apparatus using an operable platform list of the process scheduling interface, target processing units respectively used for executing the first accelerable branch code and the second accelerable branch code includes, acquiring, by the scheduling apparatus, from the operable platform list of the process scheduling interface, an accelerated processing unit and a CPU that have lightest load and/or a lowest running cost as the target processing units.

With reference to the first implementation manner of the second aspect of the embodiments of the present disclosure, in a second implementation manner of the second aspect of the embodiments of the present disclosure, the process scheduling interface further includes a preferential processor list, and the preferential processor list includes a preset quantity of accelerated processing units that are in the operable platform list and whose running cost is less than a preset value, and the acquiring, by the scheduling apparatus, from the operable platform list of the process scheduling interface, an accelerated processing unit and a CPU that have lightest load and/or a lowest running cost as the target processing units includes acquiring, by the scheduling apparatus, from the preferential processor list of the process scheduling interface, the accelerated processing unit that has the lightest load and/or the lowest running cost as the target processing unit that executes the first accelerable branch code, and acquiring, from the operable platform list of the process scheduling interface, the CPU that has the lightest load and/or the lowest running cost as the target processing unit that executes the second accelerable branch code.

According to a third aspect of the embodiments of the present disclosure, a compiler is provided and configured to generate executable code, where the executable code is applied to a heterogeneous system, and the heterogeneous system includes an accelerated processing unit and a CPU, and the compiler includes an acquiring unit configured to acquire resource information of the accelerated processing unit and resource information of the CPU, a generating unit configured to generate an operable platform list according to the resource information of the accelerated processing unit and the resource information of the CPU that are acquired by the acquiring unit, where the operable platform list includes all accelerated processing units and CPUs, an identifying unit configured to identify accelerable code from first user code according to the resource information of the accelerated processing unit acquired by the acquiring unit, an embedding unit configured to embed a hook function and an exception handling function before the accelerable code to form second user code, and a compiling unit configured to compile the second user code to obtain the executable code, where the executable code includes executable user code obtained by compiling the hook function and the exception handling function, and first accelerable branch code and second accelerable branch code that are obtained by compiling the accelerable code, where the first accelerable branch code is executed by an accelerated processing unit in the operable platform list, the second accelerable branch code is executed by a CPU in the operable platform list, and a purpose of embedding the hook function and the exception handling function is to, when the hook function is being executed in a process of executing the executable code, use condition control code in the exception handling function to select target processing units for the first accelerable branch code and the second accelerable branch code.

With reference to the third aspect of the embodiments of the present disclosure, in a first implementation manner of the third aspect of the embodiments of the present disclosure, the compiler further includes an evaluating unit configured to call a running cost evaluation function to perform running cost evaluation for the accelerated processing units and the CPUs.

With reference to the first implementation manner of the third aspect of the embodiments of the present disclosure, in a second implementation manner of the third aspect of the embodiments of the present disclosure, the generating unit is further configured to select, from the accelerated processing units, a preset quantity of accelerated processing units whose running cost is less than a preset value in order to generate a preferential processor list, where the preferential processor list includes the preset quantity of accelerated processing units that are in the operable platform list and whose running cost is less than the preset value, where the first accelerable branch code is executed by an accelerated processing unit in the preferential processor list.

According to a fourth aspect of the embodiments of the present disclosure, a scheduling apparatus is provided, used for scheduling in a heterogeneous system, where the heterogeneous system includes an accelerated processing unit and a CPU, and the apparatus includes an executing unit configured to load and execute executable code generated by a compiler, where the executable code includes executable user code obtained by the compiler by compiling a hook function and an exception handling function, and first accelerable branch code and second accelerable branch code that are obtained by the compiler by compiling accelerable code, where the first accelerable branch code is executed by the accelerated processing unit, and the second accelerable, an exception generating unit configured to generate an exception when the hook function is being executed, a first calling unit configured to call the exception handling function, call a process scheduling interface according to condition control code in the exception handling function, and obtain, using an operable platform list of the process scheduling interface, target processing units respectively used for executing the first accelerable branch code and the second accelerable branch code, where the operable platform list includes all accelerated processing units and CPUs, and a second calling unit configured to call the target processing units in order to use the target processing units to execute the first accelerable branch code and the second accelerable branch code.

With reference to the fourth aspect of the embodiments of the present disclosure, in a first implementation manner of the fourth aspect of the embodiments of the present disclosure, a method for the obtaining, by the first calling unit using an operable platform list of the process scheduling interface, target processing units respectively used for executing the first accelerable branch code and the second accelerable branch code includes acquiring, by the first calling unit from the operable platform list of the process scheduling interface, an accelerated processing unit and a CPU that have lightest load and/or a lowest running cost as the target processing units.

With reference to the first implementation manner of the fourth aspect of the embodiments of the present disclosure, in a second implementation manner of the fourth aspect of the embodiments of the present disclosure, the process scheduling interface further includes a preferential processor list, and the preferential processor list includes a preset quantity of accelerated processing units that are in the operable platform list and whose running cost is less than a preset value, and the acquiring, by the first calling unit from the operable platform list of the process scheduling interface, an accelerated processing unit and a CPU that have lightest load and/or a lowest running cost as the target processing units includes acquiring, by the first calling unit from the preferential processor list of the process scheduling interface, the accelerated processing unit that has the lightest load and/or the lowest running cost as the target processing unit that executes the first accelerable branch code, and acquiring, from the operable platform list of the process scheduling interface, the CPU that has the lightest load and/or the lowest running cost as the target processing unit that executes the second accelerable branch code.

According to a fifth aspect of the embodiments of the present disclosure, a scheduling system is provided, where the scheduling system includes the compiler according to the third aspect of the embodiments of the present disclosure, the scheduling apparatus according to the fourth aspect of the embodiments of the present disclosure, and at least one accelerated processing unit and at least one CPU.

It can be learned from the foregoing technical solutions that the embodiments of the present disclosure have the following advantages.

According to the embodiments of the present disclosure, a compiler acquires resource information of an accelerated processing unit and resource information of a CPU in order to generate an operable platform list, identifies accelerable code from first user code according to the resource information of the accelerated processing unit, then embeds a hook function and an exception handling function before the accelerable code to form second user code, and finally, compiles the second user code to obtain the executable code, where the executable code includes executable user code obtained by compiling the hook function and the exception handling function, and first accelerable branch code and second accelerable branch code that are obtained by compiling the accelerable code, where the first accelerable branch code is executed by an accelerated processing unit in the operable platform list, the second accelerable branch code is executed by a CPU in the operable platform list, and a purpose of embedding the hook function and the exception handling function is to, when the hook function is being executed in a process of executing the executable code, use condition control code in the exception handling function to select target processing units for the first accelerable branch code and the second accelerable branch code. Therefore, the executable code generated in the embodiments of the present disclosure can automatically implement proper scheduling of processors according to an actual situation during execution, which simplifies developers' work and implements proper utilization of system resources.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure shall fall within the protection scope of the present disclosure.

Embodiments of the present disclosure provide a code generating method, a compiler, a scheduling method, an apparatus and a scheduling system. Executable code generated in the embodiments of the present disclosure can automatically implement proper scheduling of processors during execution.

Figure 1:
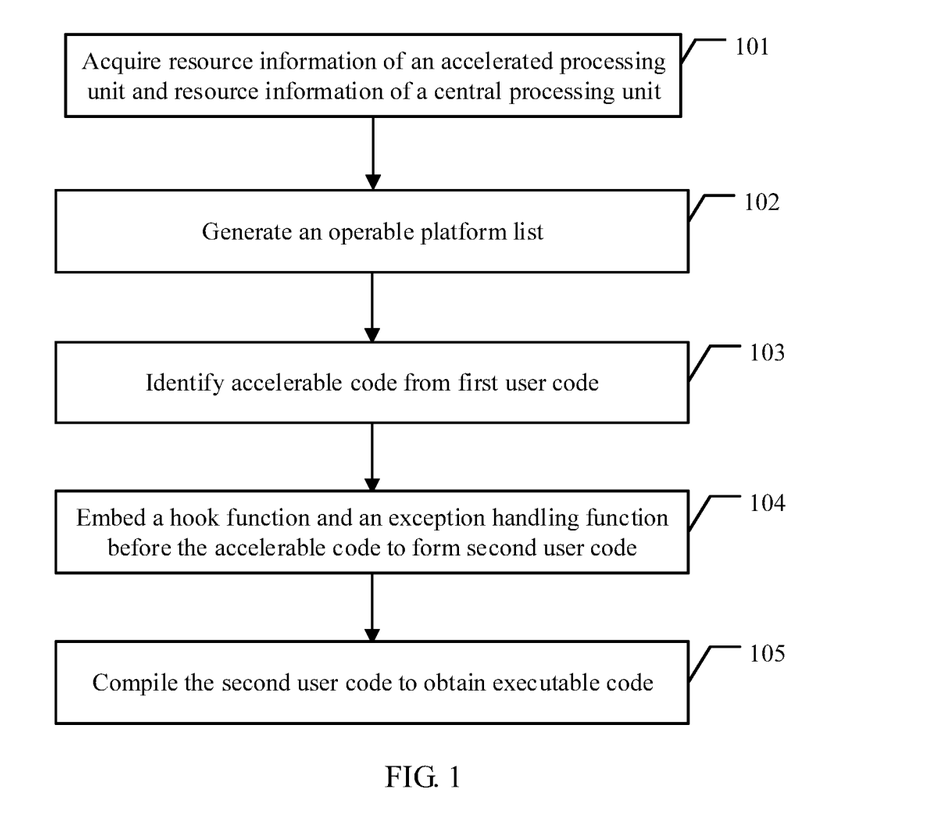
FIG. 1 is a schematic diagram of one embodiment of a code generating method in embodiments of the present disclosure.

With reference to FIG. 1, FIG. 1 shows an embodiment of a code generating method in the embodiments of the present disclosure. The code generating method in this embodiment is applied to a scheduling system, where the scheduling system includes a heterogeneous system and a compiler. Code generated in this embodiment is executable code that may be applied to the heterogeneous system, and the heterogeneous system includes an accelerated processing unit and a CPU. The method in this embodiment includes the following steps.

Step 101: The compiler acquires resource information of the accelerated processing unit and resource information of the CPU.

The compiler calls a system knowledge base, and acquires, from the system knowledge base, hardware resource information of the current system, where the hardware resource information mainly includes the resource information of the accelerated processing unit and the resource information of the CPU.

Step 102: The compiler generates an operable platform list.

The compiler generates the operable platform list according to the identified resource information of the accelerated processing unit and resource information of the CPU, where the operable platform list includes all accelerated processing units and CPUs.

Step 103: The compiler identifies accelerable code from first user code.

The compiler identifies the accelerable code from the first user code according to the acquired resource information of the accelerated processing unit, and after being compiled, the accelerable code may run on an accelerated processing unit or a CPU.

Step 104: The compiler embeds a hook function and an exception handling function before the accelerable code to form second user code.

A main purpose of the hook function is to generate an exception, and the exception handling function is mainly used to resolve the exception generated by the hook function, and the exception handling function includes condition control code. After identifying the accelerable code, the compiler embeds the hook function and the exception handling function before the accelerable code to form the second user code. Therefore, the second user code includes the hook function, the exception handling function, and the accelerable code.

Step 105: The compiler compiles the second user code to obtain the executable code.

The executable code obtained by compilation includes executable user code, first accelerable branch code, and second accelerable branch code. The executable user code is obtained by compiling the hook function and the exception handling function in the second user code, and the first accelerable branch code and the second accelerable branch code are obtained by compiling the accelerable code in the second user code, where the first accelerable branch code is mainly used for execution on an accelerated processing unit in the operable platform list, and the second accelerable branch code is mainly used for execution on a CPU in the operable platform list.

In addition, in step 104, a purpose of the embedding the hook function and the exception handling function before the accelerable code is to, when the hook function is being executed in a process of executing the executable code, generate an exception, and then use the condition control code in the exception handling function to select target processing units for the first accelerable branch code and the second accelerable branch code. Therefore, the executable code generated in this embodiment can automatically call appropriate processors during execution, and a developer does not need to solve the problem of system resource scheduling in advance.

In addition, it should be noted that the first user code mentioned in this embodiment not only includes the accelerable code, but also includes non-accelerable code, and any method in the prior art may be used as a method for compiling the non-accelerable code. The hook function and the exception handling function embedded in this embodiment only work on the accelerable code. A main purpose of this embodiment is to compile the accelerable code such that when the hook function is being executed in the process of executing the executable code obtained after compilation, use the condition control code in the exception handling function to automatically select target processing units for the executable code obtained after compilation (the first accelerable branch code and the second accelerable branch code).

In this embodiment, a compiler, before compiling accelerable code, embeds a hook function and an exception handling function before the accelerable code to form second user code, and then compiles the second user code to obtain the executable code. A purpose of embedding the hook function and the exception function is to, when the hook function is being executed in a process of executing the executable code, use condition control code in the exception handling function to select target processing units for first accelerable branch code and second accelerable branch code. Therefore, the executable code generated in this embodiment can automatically implement proper scheduling of processors according to an actual situation during execution, which simplifies developer's work and achieves proper utilization of system resources.

Figure 2:
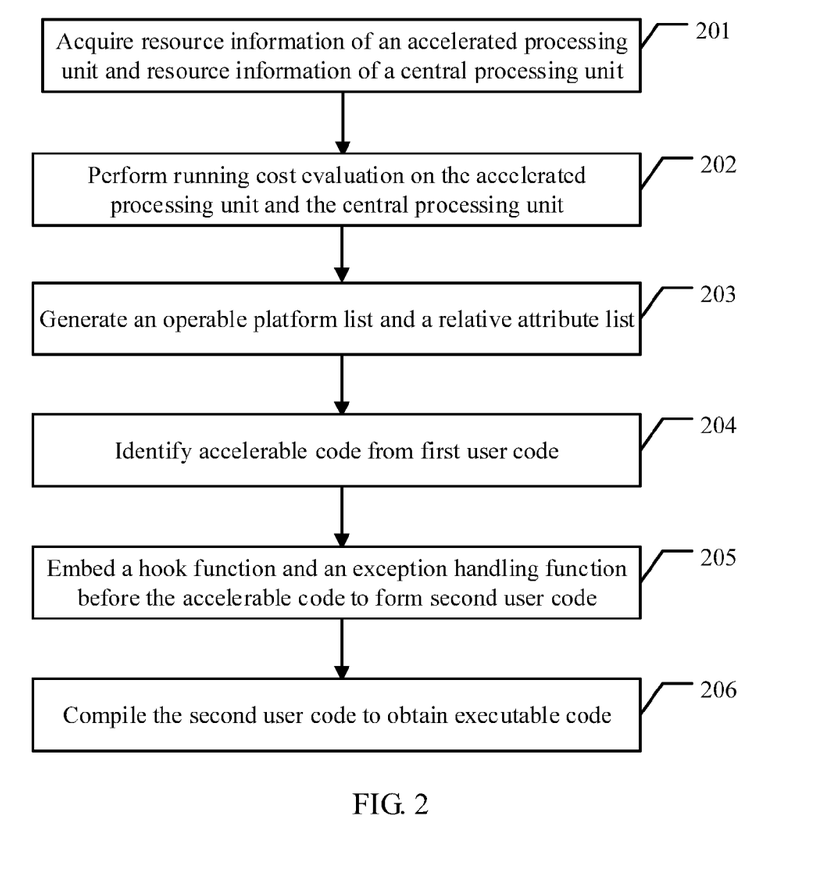
FIG. 2 is a schematic diagram of another embodiment of the code generating method in embodiments of the present disclosure.

For ease of understanding, a specific embodiment is used to describe a code generating method in an embodiment of the present disclosure in the following. With reference to FIG. 2, the code generating method in this embodiment is also applied to a scheduling system, where the scheduling system includes a heterogeneous system and a compiler. Code generated in this embodiment is executable code that may also be applied to the heterogeneous system, where the heterogeneous system includes an accelerated processing unit and a CPU. The method in this embodiment includes the following steps.

Step 201: The compiler acquires resource information of the accelerated processing unit and resource information of the CPU.

The compiler calls a system knowledge base, and acquires, from the system knowledge base, hardware resource information of the current system, where the hardware resource information mainly includes the resource information of the accelerated processing unit and the resource information of the CPU.

Step 202: The compiler calls a running cost evaluation function to perform running cost evaluation for the accelerated processing unit and the CPU.

The compiler randomly selects a piece of code from first user code, and compiles the code, where the compiled code may be referred to as test code herein. The compiler separately runs this piece of test code on the accelerated processing unit and the CPU, and calls the running cost evaluation function to perform running cost evaluation for both the accelerated processing unit and the CPU, where the running cost herein refers to a time for running the test code by the processing units. For a same piece of test code, a longer time required for running indicates a higher running cost of a processing unit.

Step 203: The compiler generates an operable platform list and a preferential processor list.

The compiler generates the operable platform list and the preferential processor list after performing the running cost evaluation for the accelerated processing unit and the CPU The operable platform list includes all accelerated processing units and CPUs, and the operable platform list further includes a serial number, a running cost, and the like of each processing unit, while the preferential processor list only includes a preset quantity of accelerated processing units that are in the operable platform list and whose running cost is less than a preset value.

Step 204: The compiler identifies accelerable code from first user code.

The compiler identifies the accelerable code from the first user code according to the acquired resource information of the accelerated processing unit. Compiled accelerable code may run on an accelerated processing unit or a CPU. However, a running cost of the accelerated processing unit is less than a running cost of the CPU.

Step 205: The compiler embeds a hook function and an exception handling function before the accelerable code to form second user code.

A main function of the hook function is to generate an exception, and the exception handling function is mainly used to resolve the exception generated by the hook function, and the exception handling function includes condition control code. After identifying the accelerable code, the compiler embeds the hook function and the exception handling function before the accelerable code to form the second user code. Therefore, the second user code includes the hook function, the exception handling function, and the accelerable code.

Step 206: The compiler compiles the second user code to obtain the executable code.

The executable code obtained by compilation includes executable user code, first accelerable branch code and second accelerable branch code. The executable user code is obtained by compiling the hook function and the exception handling function in the second user code, and the first accelerable branch code and the second accelerable branch code are both obtained by compiling the accelerable code in the second user code.

In this embodiment, to improve compilation efficiency, the compiler generates the preferential processor list and the operable platform list before compiling the second user code. Therefore, the compiler may compile the accelerable code into the first accelerable branch code that is only used for execution on accelerated processing units in the preferential processor list, and accelerated processing units in the preferential processor list are only a part of accelerated processing units in the operable platform list. Therefore, the method in this embodiment reduces a compilation time. In addition, the second accelerable branch code in the executable code is executed by all the CPUs in the operable platform list.

A purpose of embedding accelerable code, the hook function and the exception handling function before the accelerable code in step 205 is to, when the hook function is being executed in a process of executing the executable code, generate an exception, and then use condition control code in the exception handling function to select target processing units for the first accelerable branch code and the second accelerable branch code. Therefore, the executable code generated in this embodiment can automatically call appropriate processors during execution, and a developer does not need to solve the problem of system resource scheduling in advance.

It should be noted that the first user code mentioned in this embodiment not only includes the accelerable code, but also includes non-accelerable code, and any method in the prior art may be used as a method for compiling the non-accelerable code. The hook function and the exception handling function embedded in this embodiment only work on the accelerable code. A main purpose of this embodiment is to compile the accelerable code such that when the hook function is being executed in the process of executing the executable code obtained after compilation, use the condition control code in the exception handling function to automatically select target processing units for the executable code obtained after compilation (the first accelerable branch code and the second accelerable branch code).

In this embodiment, a compiler generates an operable platform list and a preferential processor list after performing running cost evaluation for an accelerated processing unit and a CPU; before compiling accelerable code, embeds a hook function and an exception handling function before the accelerable code to form second user code, and then compiles the second user code to obtain the executable code, where first accelerable branch code in the executable code is used only for execution on an accelerated processing unit in the preferential processor list, and accelerated processing units in the preferential processor list are only a part of accelerated processing units in the operable platform list. Therefore, the code generating method provided in this embodiment reduces a compilation time and improves compilation efficiency. In addition, a purpose of embedding the hook function and the exception function is to, when the hook function is being executed in a process of executing the executable code, use condition control code in the exception handling function to select target processing units for the first accelerable branch code and second accelerable branch code. Therefore, the executable code generated in this embodiment can automatically implement proper scheduling of processors according to an actual situation during execution, which simplifies developer's work and implements proper utilization of system resources.

The foregoing two embodiments describe an executable code generating method. A method for scheduling a heterogeneous system by a scheduling apparatus by executing executable code is described in the following, with reference to FIG. 3. The scheduling method in this embodiment is applied to a scheduling system, the scheduling system in this embodiment may include a scheduling apparatus and a heterogeneous system, and the heterogeneous system includes an accelerated processing unit and a CPU. An embodiment of the scheduling method according to an embodiment of the present disclosure includes the following steps.

Figure 3:
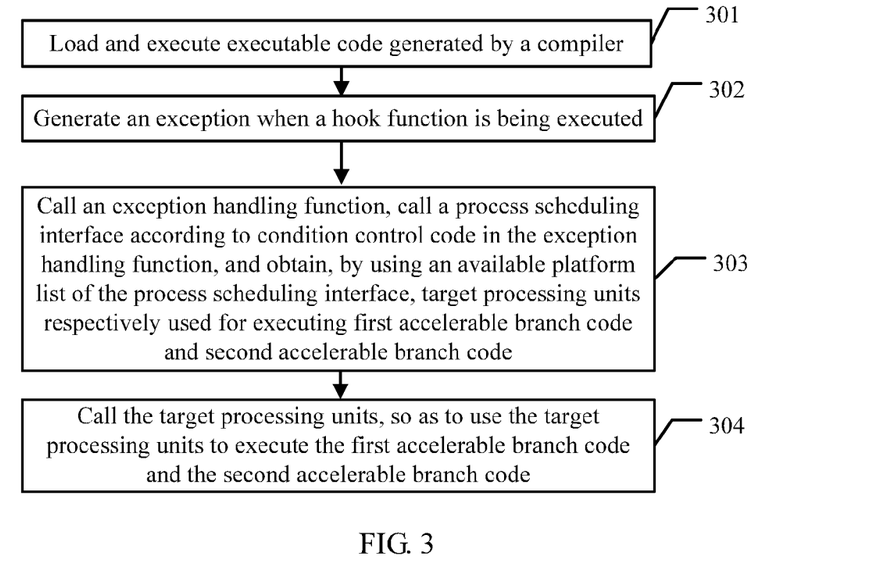
FIG. 3 is a schematic diagram of one embodiment of a scheduling method in embodiments of the present disclosure.

Step 301: The scheduling apparatus loads and executes executable code generated by a compiler.

The executable code includes executable user code obtained by the compiler by compiling a hook function and an exception handling function, and first accelerable branch code and second accelerable branch code that are obtained by the compiler by compiling accelerable code, where the first accelerable branch code is executed by the accelerated processing unit, and the second accelerable is executed by the CPU.

The hook function and the exception handling function only work on the first accelerable branch code and the second accelerable branch code that are obtained by compiling the accelerable code, and do not work on other code obtained by compiling non-accelerable code.

Step 302: The scheduling apparatus generates an exception when a hook function is being executed.

Step 303: The scheduling apparatus calls an exception handling function, calls a process scheduling interface according to condition control code in the exception handling function, and obtains, using an operable platform list of the process scheduling interface, target processing units respectively used for executing first accelerable branch code and second accelerable branch code.

After generating the exception, the scheduling apparatus calls the exception handling function, and calls the process scheduling interface according to the condition control code in the exception handling function, a parameter of the process scheduling interface is the operable platform list, where the operable platform list includes all accelerated processing units and CPUs. The scheduling apparatus obtains, using the operable platform list of the process scheduling interface, the target processing units respectively used for executing the first accelerable branch code and the second accelerable branch code.

Step 304: The scheduling apparatus calls the target processing units in order to use the target processing units to execute the first accelerable branch code and the second accelerable branch code.

In this embodiment, executable code is executed in a scheduling apparatus, and an exception is generated when a hook function is being executed. The scheduling apparatus calls an exception handling function in order to call a process scheduling interface using condition control code in the exception handling function, acquires, using an operable platform list of the process scheduling interface, target processing units respectively used for executing first accelerable branch code and second accelerable branch code, and then calls the target processing units to execute corresponding accelerable branch code. In a process of executing the executable code, the scheduling apparatus may automatically acquire, using the condition control code, a suitable target processing unit to execute corresponding accelerable branch code, and a developer does not need to solve the problem of system resource scheduling by himself/herself, which simplifies developer's work and implements proper utilization of system resources.

Figure 4:
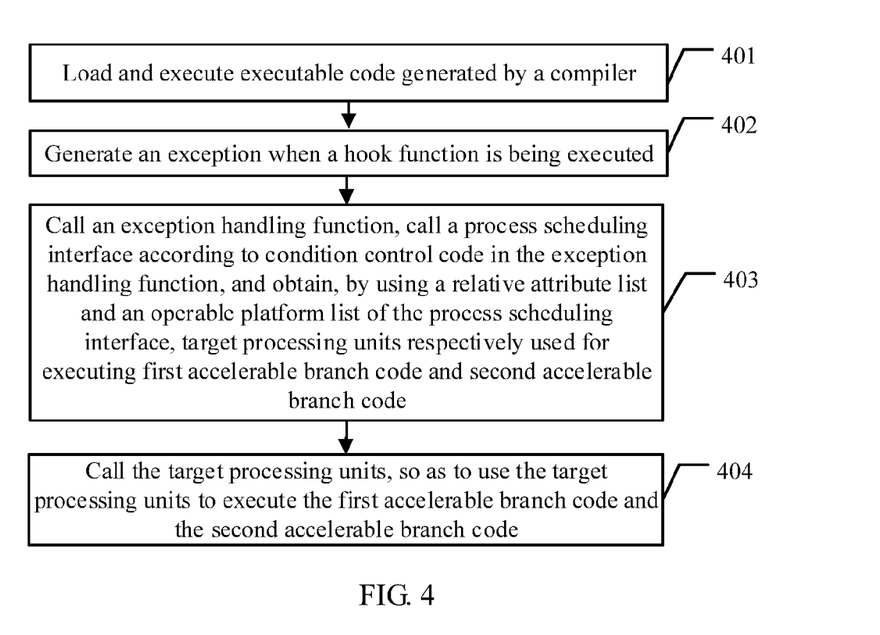
FIG. 4 is a schematic diagram of another embodiment of the scheduling method in embodiments of the present disclosure.

For ease of understanding, a specific embodiment is used to describe a scheduling method in an embodiment of the present disclosure in the following. With reference to FIG. 4, the scheduling method in this embodiment is applied to a scheduling system, and the scheduling system in this embodiment may include a scheduling apparatus and a heterogeneous system. The heterogeneous system includes an accelerated processing unit and a CPU. Another embodiment of the scheduling method according to this embodiment of the present disclosure includes the following steps.

Step 401: The scheduling apparatus loads and executes executable code generated by a compiler.

The executable code includes executable user code obtained by the compiler by compiling a hook function and an exception handling function, and first accelerable branch code and second accelerable branch code that are obtained by the compiler by compiling accelerable code, where the first accelerable branch code is executed by the accelerated processing unit, and the second accelerable is executed by the CPU.

The hook function and the exception handling function only work on the first accelerable branch code and the second accelerable branch code that are obtained by compiling the accelerable code, and do not work on other code obtained by compiling non-accelerable code.

Step 402: The scheduling apparatus generates an exception when a hook function is being executed.

Step 403: The scheduling apparatus calls an exception handling function, calls a process scheduling interface according to condition control code in the exception handling function, and obtains, using a preferential processor list and an operable platform list that are of the process scheduling interface, target processing units respectively used for executing first accelerable branch code and second accelerable branch code.

After generating the exception, the scheduling apparatus calls the exception handling function, and calls the process scheduling interface according to the condition control code in the exception handling function; a parameter of the process scheduling interface is the preferential processor list and the operable platform list, where the operable platform list includes all accelerated processing units and CPUs, and the preferential processor list includes a preset quantity of accelerated processing units that are in the operable platform list and whose running cost is less than a preset value. The scheduling apparatus obtains, using the preferential processor list of the process scheduling interface, the target processing unit used for executing the first accelerable branch code, and obtains, using the operable platform list, the target processing unit used for executing the second accelerable branch code.

The scheduling apparatus acquires, from the preferential processor list of the process scheduling interface, an accelerated processing unit that has lightest load and/or a lowest running cost as the target processing unit that executes the first accelerable branch code, and acquires, from the operable platform list of the process scheduling interface, a CPU that has lightest load and/or a lowest running cost as the target processing unit that executes the second accelerable branch code.

Step 404: The scheduling apparatus calls the target processing units in order to use the target processing units to execute the first accelerable branch code and the second accelerable branch code.

In this embodiment, executable code is executed in a scheduling apparatus, and an exception is generated when a hook function is being executed. The scheduling apparatus calls an exception handling function in order to call a process scheduling interface using condition control code in the exception handling function, acquires, using a preferential processor list and an operable platform list that are of the process scheduling interface, target processing units respectively used for executing first accelerable branch code and second accelerable branch code, and then calls the target processing units to execute corresponding accelerable branch code. In a process of executing the executable code, the scheduling apparatus may automatically acquire, using the condition control code, a suitable target processing unit to execute corresponding accelerable branch code, and a developer does not need to solve the problem of system resource scheduling by himself/herself, which simplifies developer's work and implements proper utilization of system resources.

Figure 5:
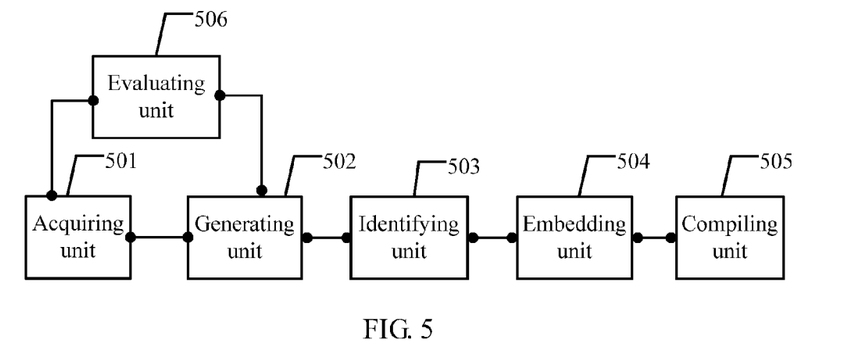
FIG. 5 is a schematic diagram of one embodiment of a compiler according to embodiments of the present disclosure.

The following describes a compiler according to an embodiment of the present disclosure. With reference to FIG. 5, the compiler in this embodiment is configured to generate executable code that is executed on a heterogeneous system, where the heterogeneous system in this embodiment may include an accelerated processing unit and a CPU. An embodiment of the compiler in this embodiment of the present disclosure includes an acquiring unit 501 configured to acquire resource information of the accelerated processing unit and resource information of the CPU, a generating unit 502 configured to generate an operable platform list according to the resource information of the accelerated processing unit and the resource information of the CPU that are acquired by the acquiring unit 501, where the operable platform list includes all accelerated processing units and CPUs, an identifying unit 503 configured to identify accelerable code from first user code according to the resource information of the accelerated processing unit acquired by the acquiring unit 501, an embedding unit 504 configured to embed a hook function and an exception handling function before the accelerable code to form second user code, a compiling unit 505 configured to compile the second user code to obtain the executable code, where the executable code includes executable user code obtained by compiling the hook function and the exception handling function, and first accelerable branch code and second accelerable branch code that are obtained by compiling the accelerable code, where the first accelerable branch code is executed by an accelerated processing unit in the operable platform list, the second accelerable branch code is executed by a CPU in the operable platform list, and a purpose of embedding the hook function and the exception handling function is to, when the hook function is being executed in a process of executing the executable code, use condition control code in the exception handling function to select target processing units for the first accelerable branch code and the second accelerable branch code, and an evaluating unit 506 configured to call a running cost evaluation function to perform running cost evaluation for the accelerated processing units and the CPUs.

For ease of understanding, the following describes a manner of interaction between the units of the compiler in this embodiment using a practical application scenario, which is as follows.

The acquiring unit 501 calls a system knowledge base, and acquires, from the system knowledge base, hardware resource information of the current system, where the hardware resource information mainly includes the resource information of the accelerated processing unit and the resource information of the CPU.

The generating unit 502 generates the operable platform list according to the resource information of the accelerated processing unit and the resource information of the CPU that are acquired by the acquiring unit 501, where the operable platform list includes all the accelerated processing units and the CPUs.

The identifying unit 503 identifies the accelerable code from the first user code according to the resource information of the accelerated processing unit acquired by the acquiring unit 501, and after being compiled, the accelerable code may run on an accelerated processing unit or a CPU.

The embedding unit 504 embeds the hook function and the exception handling function before the accelerable code identified by the identifying unit 503 to form the second user code. A main function of the hook function is to generate an exception, and the exception handling function is mainly used to resolve the exception generated by the hook function, and the exception handling function includes the condition control code. The embedding unit 504 embeds the hook function and the exception handling function before the identified accelerable code to form the second user code. Therefore, the second user code includes the hook function, the exception handling function, and the accelerable code.

The compiling unit 505 compiles the second user code formed using the embedding unit 504 to obtain the executable code. The executable code obtained by compilation includes the executable user code, the first accelerable branch code and the second accelerable branch code. The executable user code is obtained by compiling the hook function and the exception handling function in the second user code, and the first accelerable branch code and the second accelerable branch code are obtained by compiling the accelerable code in the second user code, where the first accelerable branch code is executed by an accelerated processing unit in the operable platform list, and the second accelerable branch code is executed by a CPU in the operable platform list.

That the embedding unit 504 embeds the hook function and the exception handling function before the accelerable code is to, when the hook function is being executed in a process of executing the executable code, an exception is generated, and then use condition control code in the exception handling function to select target processing units for the first accelerable branch code and the second accelerable branch code. Therefore, the executable code generated in this embodiment can automatically call appropriate processors during execution, and a developer does not need to solve the problem of system resource scheduling in advance.

Besides, the compiler in this embodiment may further include the evaluating unit 506, and the evaluating unit 506 is configured to call the running cost evaluation function to perform the running cost evaluation for the accelerated processing unit and the CPU that are acquired by the acquiring unit 501. A specific evaluation method may be as follows.

The evaluating unit 506 randomly selects a piece of code from the first user code, and compiles the code, where the compiled code may be referred to as test code herein. The evaluating unit 506 separately runs this piece of test code on the accelerated processing unit and the CPU, and simultaneously calls the running cost evaluation function to perform running cost evaluation for the accelerated processing unit and the CPU, where the running cost herein refers to a time for running the test code by the processing units. For a same piece of test code, if a time required for running is longer, a running cost of a processing unit is higher.

After the evaluating unit 506 performs running cost evaluation for the accelerated processing units and the CPUs in the system, the operable platform list generated by the generating unit 502 may include a running cost of each processing unit.

To improve compilation efficiency, the generating unit 502 may further select, before the compiling unit 505 compiles the second user code, a preset quantity of accelerated processing units whose running cost is less than a preset value to generate a preferential processor list, and the preferential processor list includes the preset quantity of accelerated processing units that are in the operable platform list and whose running cost is less than the preset value. Therefore, the compiling unit 505 may compile the accelerable code to generate the first accelerable branch code that can be used only for execution on an accelerated processing unit in the preferential processor list, and accelerated processing units in the preferential processor list are only a part of accelerated processing units in the operable platform list. Therefore this compilation method reduces a compilation time.

In addition, it should be noted that the first user code mentioned in this embodiment not only includes the accelerable code, but also includes non-accelerable code, and any method in the prior art may be used as a method for compiling the non-accelerable code. The hook function and the exception handling function embedded in this embodiment only work on the accelerable code. A main purpose of this embodiment is to compile, by a compiler, the accelerable code such that when the hook function is being executed in the process of executing the executable code obtained after compilation, use the condition control code in the exception handling function to automatically select target processing units for the executable code obtained after compilation (the first accelerable branch code and the second accelerable branch code).

In this embodiment, a generating unit generates, after an evaluating unit performs running cost evaluation for an accelerated processing unit and a CPU, an operable platform list and a preferential processor list, and the operable platform list and the preferential processor list may include a running cost of each processing unit, and before a compiling unit compiles accelerable code, an embedding unit embeds a hook function and an exception handling function before the accelerable code to form second user code, and then the compiling unit compiles the second user code to obtain the executable code. In this embodiment, the accelerable code may be compiled into the second accelerable branch code used for execution on all CPUs in the operable platform list, and first accelerable branch code used for execution only on accelerated processing units in the preferential processor list, and accelerated processing units in the preferential processor list are only a part of accelerated processing units in the operable platform list. Therefore, the code generating method provided in this embodiment can reduce a compilation time and improves compilation efficiency. In addition, a purpose of embedding the hook function and the exception function is to, when the hook function is being executed in a process of executing the executable code, use condition control code in the exception handling function to select target processing units for the first accelerable branch code and the second accelerable branch code. Therefore, the executable code generated by the compiler in this embodiment can automatically implement proper scheduling of processors according to an actual situation during execution, which simplifies developer's work and implements proper utilization of system resources.

Figure 6:
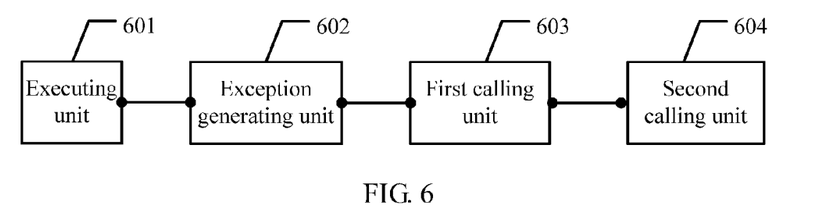
FIG. 6 is a schematic diagram of one embodiment of a scheduling apparatus in embodiments of the present disclosure.

The following describes a scheduling apparatus according to an embodiment of the present disclosure. With reference to FIG. 6, the scheduling apparatus in this embodiment is used for scheduling in a heterogeneous system, and the heterogeneous system in this embodiment may include an accelerated processing unit and a CPU. An embodiment of the scheduling apparatus in this embodiment of the present disclosure includes an executing unit 601 configured to load and execute executable code generated by a compiler, where the executable code includes executable user code obtained by the compiler by compiling a hook function and an exception handling function, and first accelerable branch code and second accelerable branch code that are obtained by the compiler by compiling accelerable code, where the first accelerable branch code is executed by the accelerated processing unit, and the second accelerable branch code is used for execution on the CPU, an exception generating unit 602 configured to generate an exception when the hook function is being executed, a first calling unit 603 configured to call the exception handling function, call a process scheduling interface according to condition control code in the exception handling function, and obtain, using an operable platform list of the process scheduling interface, target processing units respectively used for executing the first accelerable branch code and the second accelerable branch code, where the operable platform list includes all accelerated processing units and CPUs, and a second calling unit 604 configured to call the target processing units in order to use the target processing units to execute the first accelerable branch code and the second accelerable branch code.

For ease of understanding, the following describes a manner of interaction between the units of the scheduling apparatus in this embodiment using a practical application scenario, which is as follows.

The executing unit 601 loads and executes the executable code generated by the compiler, where the executable code includes the executable user code obtained by the compiler by compiling the hook function and the exception handling function, and the first accelerable branch code, used for execution on the accelerated processing unit, and the second accelerable branch code, used for execution on the CPU, that are obtained by the compiler by compiling the accelerable code.

The hook function and the exception handling function only work on the first accelerable branch code and the second accelerable branch code that are obtained by compiling the accelerable code, and does not work on other code obtained by compiling non-accelerable code.

The exception generating unit 602 generates an exception when the executing unit 601 is executing the hook function.

After the exception generating unit 602 generates an exception, the first calling unit 603 calls the exception handling function, and calls the process scheduling interface according to the condition control code in the exception handling function.

If the compiler generates only the operable platform list in a phrase of code compilation, a parameter of the process scheduling interface is the operable platform list, and the operable platform list includes all the accelerated processing units and CPUs. Such a situation indicates that the first accelerable branch code in the executable code may be executed on all the accelerated processing units in the operable platform list, and the second accelerable branch code in the executable code may be executed on all the CPUs in the operable platform list. The first calling unit 603 may obtain, using the operable platform list of the process scheduling interface, the target processing units respectively used for executing the first accelerable branch code and the second accelerable branch code.

The first calling unit 603 acquires, from the operable platform list of the process scheduling interface, an accelerated processing unit and a CPU that have lightest load and/or a lowest running cost as the target processing units that respectively execute the first accelerable branch code and the second accelerable branch code.

In addition, if the compiler generates the operable platform list and a preferential processor list in the phrase of code compilation, a parameter of the process scheduling interface is the operable platform list and the preferential processor list. The operable platform list includes all the accelerated processing units and CPUs, and the preferential processor list includes a preset quantity of accelerated processing units that are in the operable platform list and whose running cost is less than a preset value. Such a situation indicates that the first accelerable branch code in the executable code can only be executed on a part of the accelerated processing units, and this part of the accelerated processing units are the accelerated processing units in the preferential processor list, and the second accelerable branch code can be executed on all the CPUs in the operable platform list.

When the parameter of the process scheduling interface is the operable platform list and the preferential processor list, the first calling unit 603 acquires, from the preferential processor list, the accelerated processing unit that has the lightest load and/or the lowest running cost as the target processing unit that executes the first accelerable branch code, and acquires, from the operable platform list, the CPU that has the lightest load and/or the lowest running cost as the target processing unit that executes the second accelerable branch code.

The second calling unit 604 calls the target processing units acquired by the first calling unit 603 in order to use the target processing units to execute the first accelerable branch code and the second accelerable branch code.

In this embodiment, an executing unit executes executable code, and an exception generating unit generates an exception when the executing unit is executing a hook function, a first calling unit calls an exception handling function in order to call a process scheduling interface according to condition control code in the exception handling function and acquire, using a preferential processor list and an operable platform list of the process scheduling interface, target processing units respectively used for executing first accelerable branch code and second accelerable branch code; and then a second calling unit calls the target processing units to execute corresponding accelerable branch code. In a process of executing the executable code, the scheduling apparatus may automatically acquire, using the condition control code, a suitable target processing unit to execute corresponding accelerable branch code, and a developer does not need to solve the problem of system resource scheduling by himself/herself, which simplifies developer's work and implements proper utilization of system resources.

Figure 7:
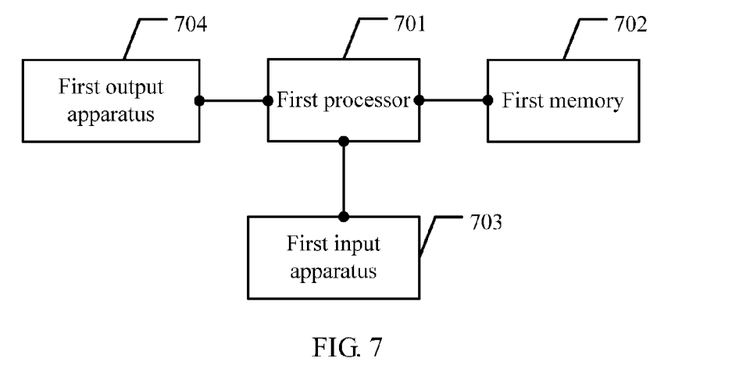
FIG. 7 is a schematic diagram of another embodiment of the compiler in embodiments of the present disclosure.

The following further describes a compiler in an embodiment of the present disclosure. With reference to FIG. 7, the compiler in this embodiment of the present disclosure includes a first processor 701, a first memory 702 configured to store cached code, a first input apparatus 703 and a first output apparatus 704.

The first processor 701 executes the following procedures: acquiring resource information of an accelerated processing unit and resource information of a CPU so as to generate an operable platform list, and identifying accelerable code from first user code according to the resource information of the accelerated processing unit, where the operable platform list includes all accelerated processing units and CPUs, embedding a hook function and an exception handling function before the accelerable code to form second user code, and compiling the second user code to obtain the executable code, where the executable code includes executable user code obtained by compiling the hook function and the exception handling function, and first accelerable branch code and second accelerable branch code that are obtained by compiling the accelerable code, where the first accelerable branch code is executed by an accelerated processing unit in the operable platform list, the second accelerable branch code is executed by a CPU in the operable platform list, and a purpose of embedding the hook function and the exception handling function is to, when the hook function is being executed in a process of executing the executable code, use condition control code in the exception handling function to select target processing units for the first accelerable branch code and the second accelerable branch code.

Figure 8:
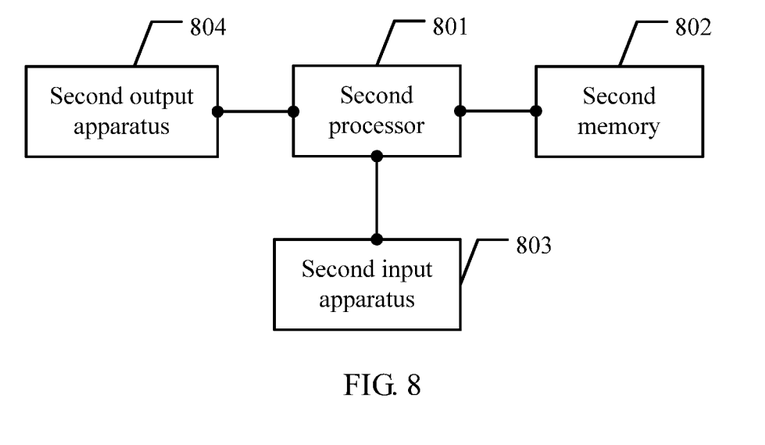
FIG. 8 is a schematic diagram of another embodiment of the scheduling apparatus in embodiments of the present disclosure.

The following further describes a scheduling apparatus in an embodiment of the present disclosure. With reference to FIG. 8, the scheduling apparatus in this embodiment of the present disclosure includes a second processor 801, a second memory 802 configured to store cached code, a second input apparatus 803 and a second output apparatus 804.

The second processor 801 executes the following procedures: loading and executing executable code generated by a compiler, where the executable code includes executable user code obtained by the compiler by compiling a hook function and an exception handling function, and first accelerable branch code, used for execution on an accelerated processing unit, and second accelerable branch code, used for execution on a CPU, that are obtained by the compiler by compiling accelerable code, generating an exception when the hook function is being executed, calling the exception handling function, calling a process scheduling interface according to condition control code in the exception handling function, and obtaining, using an operable platform list of the process scheduling interface, target processing units respectively used for executing the first accelerable branch code and the second accelerable branch code, where the operable platform list includes all accelerated processing units and CPUs, and calling the target processing units in order to use the target processing units to execute the first accelerable branch code and the second accelerable branch code.

Figure 9:
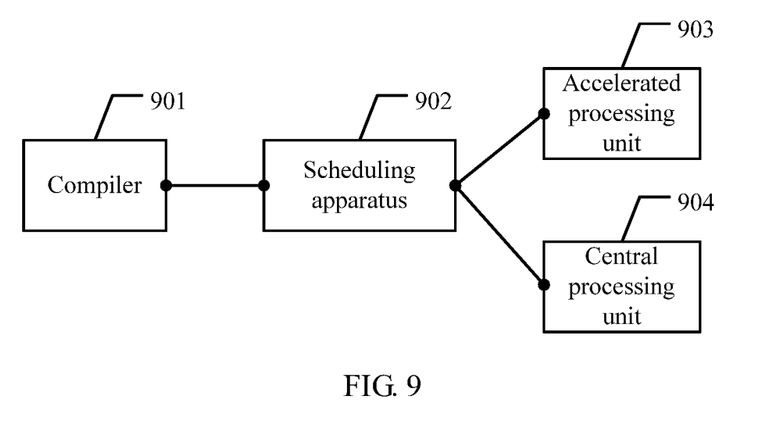
FIG. 9 is a schematic diagram of one embodiment of a scheduling system in embodiments of the present disclosure.

An embodiment of the present disclosure further provides a scheduling system. With reference to FIG. 9, the scheduling system includes a compiler 901, a scheduling apparatus 902, at least one accelerated processing unit 903 and at least one CPU 904.

It should be noted that, the compiler in this embodiment is the same as the compiler according to the foregoing FIG. 5, and the scheduling apparatus is the same as the scheduling apparatus according to the foregoing FIG. 6, and details are not described herein.

It should be noted that the described apparatus embodiment is merely exemplary. The units described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. A person of ordinary skill in the art may understand and implement the embodiments of the present disclosure without creative efforts.

Based on the description of the foregoing implementation manners, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing introduces in detail a code generating method, a compiler, a scheduling method, apparatus and a scheduling system provided by embodiments of the present disclosure. Persons of ordinary skill in the art can make variations to the present disclosure in terms of the specific implementations and application scopes according to the ideas of the embodiments of the present disclosure. Therefore, the specification shall not be construed as a limitation to the present disclosure.

What is claimed is:

1. A code generating method, applied to a scheduling system, wherein the scheduling system comprises a heterogeneous system, a compiler, and an executable code, wherein the executable code is applied to the heterogeneous system, wherein the heterogeneous system comprises an accelerated processor and a central processing unit (CPU), and wherein the method comprises:
acquiring, by the compiler, resource information of the accelerated processor and resource information of the CPU in order to generate an operable platform list;
identifying accelerable code from first user code according to the resource information of the accelerated processor, wherein the operable platform list comprises all accelerated processors and CPUs;
randomly selecting a portion of the executable code as test code;
executing the test code on each of the accelerated processors and CPUs to determine a running cost for each of the accelerated processors and CPUs, wherein the running costs correspond to times for running the test code, and wherein a higher running cost indicates a longer time for running the test code;
embedding, by the compiler, a hook function and an exception handling function to the accelerable code to form second user code, wherein the hook function generates an exception before running the accelerable code, and wherein the exception handling function comprises condition control code that is configured to handle the exception and select one of the accelerated processors or the CPUs to execute the accelerable code based on the running cost for each of the accelerated processors and CPUs; and
compiling, by the compiler, the second user code to obtain the executable code of the scheduling system,
wherein the executable code comprises executable user code obtained by compiling the hook function and the exception handling function,
wherein the executable code further comprises first accelerable branch code and second accelerable branch code that are obtained by compiling the accelerable code,
wherein the first accelerable branch code is executed by an accelerated processor in the operable platform list,
wherein the second accelerable branch code is executed by a CPU in the operable platform list,
wherein a purpose of embedding the hook function and the exception handling function is to use the condition control code in the exception handling function to select target processors for the first accelerable branch code and the second accelerable branch code when the hook function is being executed in a process of executing the executable code,
wherein before compiling, by the compiler, the second user code to obtain the executable code, the method further comprises selecting, by the compiler, from the accelerated processors, a preset quantity of accelerated processors whose running cost is less than a preset value in order to generate a preferential processor list,
wherein the preferential processor list comprises the preset quantity of accelerated processors that are in the operable platform list and whose running cost is less than the preset value, and
wherein the first accelerable branch code is executed by an accelerated processor in the preferential processor list.

2. The method according to claim 1, wherein the operable platform list includes an indication of all accelerated processing units, all CPUs, serial numbers associated with the accelerated processing units and CPUs, and the running costs associated with the accelerated processing units and CPUs.

3. The method according to claim 1, wherein the resource information of the accelerated processor and the resource information of the CPU are obtained from a system knowledge base.

4. A scheduling method, applied to a scheduling system, wherein the scheduling system comprises a scheduling apparatus and a heterogeneous system, wherein the heterogeneous system comprises an accelerated processor and a central processing unit (CPU), and wherein the method comprises:
loading and executing, by the scheduling apparatus, executable code generated by a compiler, wherein the executable code comprises executable user code obtained by the compiler by compiling a hook function, an exception handling function, first accelerable branch code, and second accelerable branch code, wherein the first accelerable branch code and the second accelerable branch code are obtained by the compiler by compiling accelerable code, wherein the first accelerable branch code is executed by the accelerated processor, and wherein the second accelerable branch code is executed by the CPU;

generating, by the scheduling apparatus, an exception when the hook function is being executed, wherein the hook function generates the exception before running the accelerable code;

calling, by the scheduling apparatus, the exception handling function;

calling a process scheduling interface according to condition control code in the exception handling function, wherein the exception handling function comprises the condition control code that is configured to handle the exception generated by the hook function and select one accelerated processor or CPU to execute the accelerable code;

obtaining, using an operable platform list of the process scheduling interface, target processors respectively used for executing the first accelerable branch code and the second accelerable branch code, wherein the operable platform list comprises all accelerated processors and CPUs;

randomly selecting, by the scheduling apparatus, a portion of the executable code as test code and executing the test code on each of the accelerated processors and CPUs to determine a running cost for each of the accelerated processors and CPUs, wherein the running costs correspond to times for running the test code, and wherein a higher running cost indicates a longer time for running the test code; and calling, by the scheduling apparatus, the target processors in order to use the target processors to execute the first accelerable branch code and the second accelerable branch code, wherein the target processors are selected based on the running cost for each of the accelerated processors and CPUs, wherein the process scheduling interface further comprises a preferential processor list, wherein the preferential processor list comprises a preset quantity of accelerated processors that are in the operable platform list and whose running cost is less than a preset value, and wherein acquiring, by the scheduling apparatus, from the operable platform list of the process scheduling interface, the accelerated processor and the CPU that have the lowest running cost as the target processors comprises:

acquiring, by the scheduling apparatus, from the preferential processor list of the process scheduling interface, the accelerated processor that has the lowest running cost as the target processor that executes the first accelerable branch code; and acquiring, from the operable platform list of the process scheduling interface, the CPU that has the lowest running cost as the target processor that executes the second accelerable branch code.

5. The method according to claim 4, wherein the operable platform list includes an indication of all accelerated processing units, all CPUs, serial numbers associated with the accelerated processing units and CPUs, and the running costs associated with the accelerated processing units and CPUs.

6. The method according to claim 4, wherein the resource information of the accelerated processor and the resource information of the CPU are obtained from a system knowledge base.

7. A device, applied to a scheduling system, wherein the scheduling system comprises a heterogeneous system and an executable code, wherein the executable code is applied to the heterogeneous system, wherein the heterogeneous system comprises an accelerated processor and a central processing unit (CPU), and wherein the device comprises:

a memory storing instructions; and a processor coupled to the memory to execute the instructions to execute a method, and wherein the method comprises:

acquiring resource information of the accelerated processing unit and resource information of the CPU in order to generate an operable platform list;

identifying accelerable code from first user code according to the resource information of the accelerated processor, wherein the operable platform list comprises all accelerated processors and CPUs;

randomly selecting a portion of the executable code as test code;

executing the test code on each of the accelerated processors and CPUs to determine a running cost for each of the accelerated processors and CPUs, wherein the running costs correspond to times for running the test code, and wherein a higher running cost indicates a longer time for running the test code;

embedding a hook function and an exception handling function to the accelerable code to form second user code, wherein the hook function generates an exception before running the accelerable code, and wherein the exception handling function comprises condition control code that is configured to handle the exception and select one of the accelerated processors or the CPUs to execute the accelerable code based on the running cost for each of the accelerated processors and CPUs; and compiling the second user code to obtain the executable code of the scheduling system, wherein the executable code comprises executable user code obtained by compiling the hook function and the exception handling function, wherein the executable code further comprises first accelerable branch code and second accelerable branch code that are obtained by compiling the accelerable code, wherein the first accelerable branch code is executed by an accelerated processor in the operable platform list, wherein the second accelerable branch code is executed by a CPU in the operable platform list, wherein a purpose of embedding the hook function and the exception handling function is to use the condition control code in the exception handling function to select target processors for the first accelerable branch code and the second accelerable branch code when the hook function is being executed in a process of executing the executable code, wherein before compiling the second user code to obtain the executable code, the method further comprises selecting, from the accelerated processors, a preset quantity of accelerated processors whose running cost is less than a preset value in order to generate a preferential processor list, wherein the preferential processor list comprises the preset quantity of accelerated processors that are in the operable platform list and whose running cost is less than the preset value, and wherein the first accelerable branch code is executed by an accelerated processor in the preferential processor list.

8. The device according to claim 7, wherein the operable platform list includes an indication of all accelerated processing units, all CPUs, serial numbers associated with the accelerated processing units and CPUs, and the running costs associated with the accelerated processing units and CPUs.

9. The device according to claim 7, wherein the resource information of the accelerated processor and the resource information of the CPU are obtained from a system knowledge base.

10. A scheduling apparatus, used for scheduling in a heterogeneous system, wherein the heterogeneous system comprises an accelerated processor and a central processing unit (CPU), and wherein the apparatus comprises:
a memory storing instructions; and
a processor coupled to the memory and configured to execute the instructions to execute a method, and
wherein the method comprises:
loading and executing executable code generated by a compiler, wherein the executable code comprises executable user code obtained by the compiler by compiling a hook function, an exception handling function, first accelerable branch code, and second accelerable branch code, wherein the first accelerable branch code and the second accelerable branch code are obtained by the compiler by compiling accelerable code, wherein the first accelerable branch code is executed by the accelerated processor, and wherein the second accelerable branch code is executed by the CPU;
generating an exception when the hook function is being executed, wherein the hook function generates the exception before running the accelerable code;
calling the exception handling function;
calling a process scheduling interface according to condition control code in the exception handling function, wherein the exception handling function comprises the condition control code that is configured to handle the exception generated by the hook function and select one accelerated processor or CPU to execute the accelerable code;
obtaining, using an operable platform list of the process scheduling interface, target processors respectively used for executing the first accelerable branch code and the second accelerable branch code, and wherein the operable platform list comprises all accelerated processors and CPUs;
randomly selecting a portion of the executable code as test code;
executing the test code on each of the accelerated processors and CPUs to determine a running cost for each of the accelerated processors and CPUs, wherein the running costs correspond to times for running the test code, and wherein a higher running cost indicates a longer time for running the test code; and
calling the target processors in order to use the target processors to execute the first accelerable branch code and the second accelerable branch code,
wherein the target processors are selected based on the running cost for each of the accelerated processors and CPUs,
wherein the process scheduling interface further comprises a preferential processor list,
wherein the preferential processor list comprises a preset quantity of accelerated processors that are in the operable platform list and whose running cost is less than a preset value, and
wherein acquiring, from the operable platform list of the process scheduling interface, the accelerated processor and the CPU that have the lowest running cost as the target processors comprises:
acquiring, from the preferential processor list of the process scheduling interface, the accelerated processing unit that has the lowest running cost as the target processing unit that executes the first accelerable branch code; and
acquiring, from the operable platform list of the process scheduling interface, the CPU that has the lowest running cost as the target processing unit that executes the second accelerable branch code.

11. The scheduling apparatus according to claim 10, wherein the operable platform list includes an indication of all accelerated processing units, all CPUs, serial numbers associated with the accelerated processing units and CPUs, and the running costs associated with the accelerated processing units and CPUs.

12. The scheduling apparatus according to claim 10, wherein the resource information of the accelerated processor and the resource information of the CPU are obtained from a system knowledge base.

* * * * *